United States Patent
Kim et al.

(10) Patent No.: US 9,750,002 B2
(45) Date of Patent: Aug. 29, 2017

(54) METHOD AND APPARATUS FOR TRANSMITTING AND RECEIVING A SIGNAL THROUGH A RELAY NODE IN A WIRELESS COMMUNICATION SYSTEM IN WHICH A CARRIER AGGREGATION METHOD IS APPLIED

(75) Inventors: Hakseong Kim, Anyang-si (KR); Hanbyul Seo, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 13/984,501

(22) PCT Filed: Feb. 3, 2012

(86) PCT No.: PCT/KR2012/000820
§ 371 (c)(1),
(2), (4) Date: Aug. 8, 2013

(87) PCT Pub. No.: WO2012/118281
PCT Pub. Date: Sep. 7, 2012

(65) Prior Publication Data
US 2013/0336198 A1    Dec. 19, 2013

Related U.S. Application Data

(60) Provisional application No. 61/448,190, filed on Mar. 1, 2011, provisional application No. 61/449,056, filed on Mar. 3, 2011.

(51) Int. Cl.
*H04B 7/14*    (2006.01)
*H04W 72/04*    (2009.01)
(Continued)

(52) U.S. Cl.
CPC .......... *H04W 72/042* (2013.01); *H04L 5/001* (2013.01); *H04L 5/0048* (2013.01); *H04L 5/0053* (2013.01); *H04B 7/15528* (2013.01)

(58) Field of Classification Search
CPC ... H04W 84/047; H04W 16/26; H04W 88/04; H04W 24/08; H04W 24/10; H04W 24/02;
(Continued)

(56) References Cited

U.S. PATENT DOCUMENTS

2010/0080166 A1* 4/2010 Palanki ............... H04B 7/2606
                                                                                  370/315
2010/0232546 A1   9/2010 Yu et al.
(Continued)

FOREIGN PATENT DOCUMENTS

| WO | 2010011104 | A2 | 1/2010 |
| WO | 2010120142 | A2 | 10/2010 |
| WO | 2011053990 | A1 | 5/2011 |

OTHER PUBLICATIONS

R. Ratasuk, et al., "Carrier aggregation in LTE-Advanced," 2010 IEEE 71st vehicular technology conference, pp. 1-5, May 19, 2010.

*Primary Examiner* — Joshua Kading
*Assistant Examiner* — Atique Ahmed
(74) *Attorney, Agent, or Firm* — Dentons US LLP

(57) ABSTRACT

The present invention relates to a method for transmitting and receiving a signal, using a macro base station, through a relay node in a wireless communication system in which a carrier aggregation method is applied. Specifically, the method comprises the steps of: receiving a downlink control channel in a first subframe of a main component carrier; and receiving a data channel on the first subframe and a second subframe after the first subframe, based on control information included in the downlink control channel, wherein the data channel is received through only one or through a plurality of sub-component carriers in the second subframe, (Continued)

and the control information includes a carrier identifier for identifying component carriers and/or a subframe identifier for identifying subframes.

16 Claims, 21 Drawing Sheets

(51) Int. Cl.
*H04L 5/00* (2006.01)
*H04B 7/155* (2006.01)

(58) Field of Classification Search
CPC ... H04W 16/14; H04B 7/155; H04B 7/15542; H04L 5/0048; H04L 43/50; H04L 43/12
USPC .......................................... 370/315, 252, 241
See application file for complete search history.

(56) References Cited

U.S. PATENT DOCUMENTS

| | | | |
|---|---|---|---|
| 2010/0265870 A1 | 10/2010 | Cai et al. | |
| 2010/0271970 A1* | 10/2010 | Pan | H04L 1/0026 370/252 |
| 2011/0273992 A1* | 11/2011 | Zhang | H04L 5/001 370/241 |
| 2012/0069802 A1* | 3/2012 | Chen | H04L 5/001 370/329 |

* cited by examiner

FIG. 2
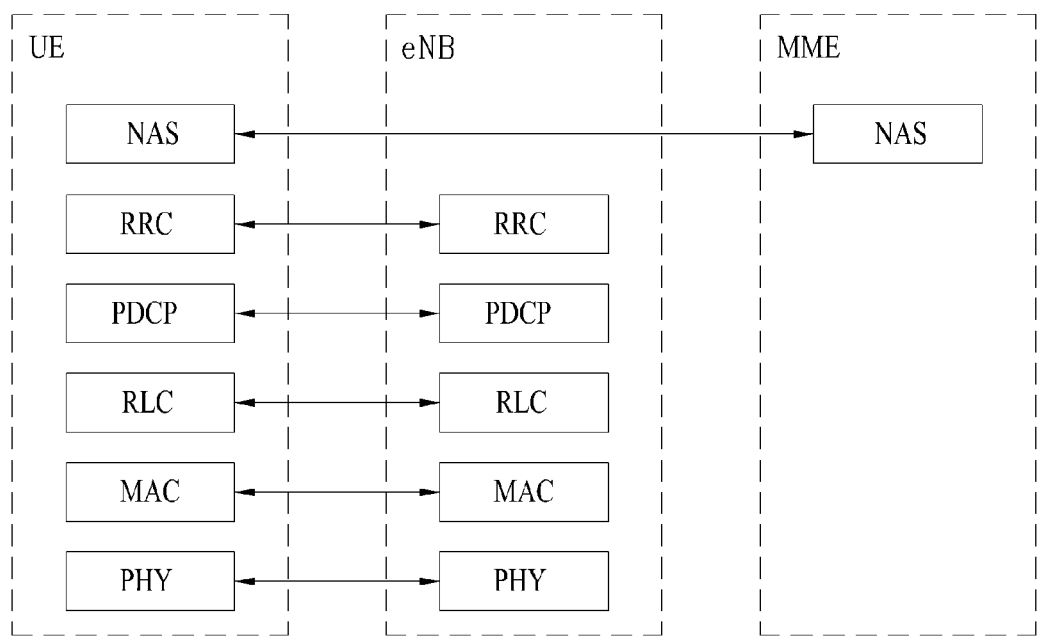
(a) contol - plane protocol stack
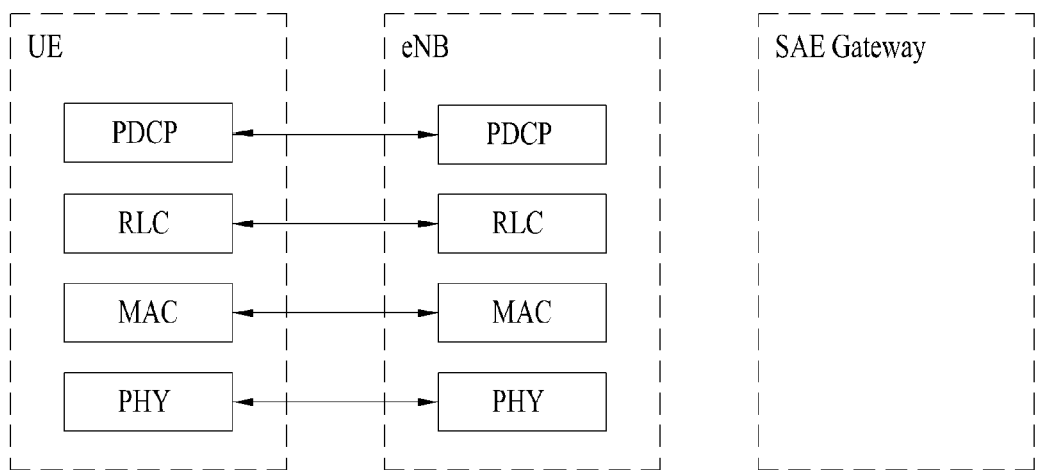
(b) user - plane protocol stack FIG. 6
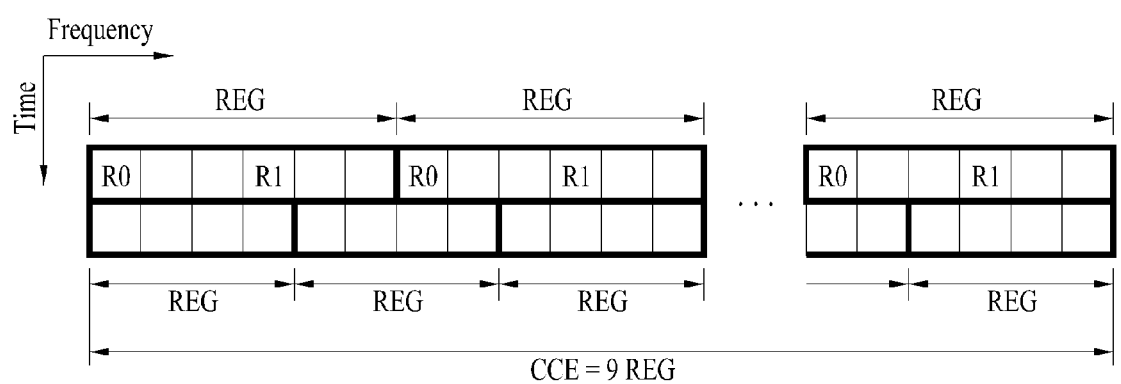
(a) 1TX or 2TX
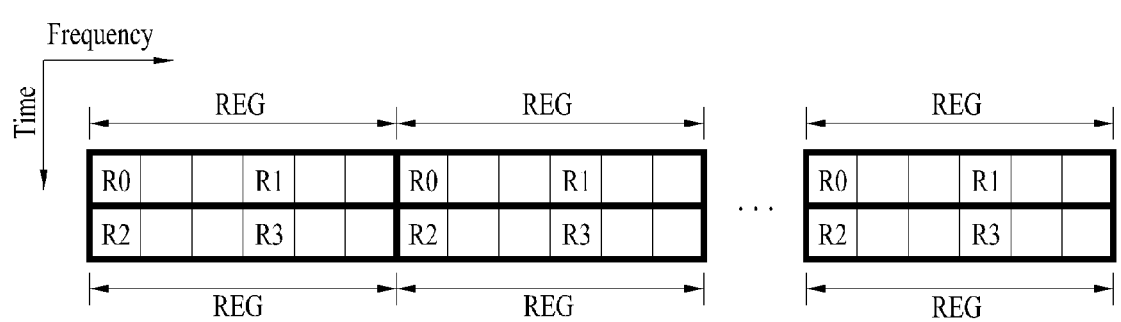
(b) 4 TX

METHOD AND APPARATUS FOR TRANSMITTING AND RECEIVING A SIGNAL THROUGH A RELAY NODE IN A WIRELESS COMMUNICATION SYSTEM IN WHICH A CARRIER AGGREGATION METHOD IS APPLIED

This Application is a 35 U.S.C. §371 National Stage Entry of International Application No. PCT/KR2012/000820, filed Feb. 2, 2012 and claims the benefit of U.S. Provisional Application Nos. 61/448,190, filed Mar. 1, 2011 and 61/449,056, filed Mar. 3, 2011, all of which are incorporated by reference in their entirety herein.

TECHNICAL FIELD

The present invention relates to a wireless communication system, and more particularly, to a method for a relay node to transceive a signal in a wireless communication system having a carrier aggregation scheme applied thereto and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

Based on the above-mentioned discussion, a method for a relay node to transceive a signal in a wireless communication system having a carrier aggregation scheme applied thereto and apparatus therefor shall be proposed in the following description.

Technical Solution

To achieve these and other advantages and in accordance with the purpose of the present invention, as embodied and broadly described, a method of transceiving a signal, which is transceived with a macro base station by a relay node in a wireless communication system having a carrier aggregation scheme applied thereto, according to one embodiment of the present invention includes the steps of receiving a downlink control channel in a $1^{st}$ subframe of a primary component carrier and receiving a data channel in the $1^{st}$ subframe and a $2^{nd}$ subframe after the $1^{st}$ subframe based on a control information included in the downlink control channel, wherein the data channel is received on at least one secondary component carrier in the $2^{nd}$ subframe and wherein the control information includes at least one of a carrier identifier for identifying a component carrier and a subframe identifier for identifying a subframe.

Preferably, the downlink control channel is received by blind decoding on a search space configured in a data region of the $1^{st}$ subframe. Preferably, the control information includes a resource allocation information on the data channel.

Preferably, the $1^{st}$ subframe of the primary component carrier does not include a subframe for a communication between the macro base station and the relay node.

Preferably, the data channel receiving step includes the steps of receiving the data channel in the $1^{st}$ subframe of the primary component carrier and the $1^{st}$ subframe of the at least one secondary component carrier and receiving the data channel in the $2^{nd}$ subframe of the at least one secondary component carrier.

Preferably, the method further includes the step of transmitting an ACK/NACK (acknowledgement/negative-ACK) information on a codeword received on the data channel to the macro base station, and a resource for transmitting the ACK/NACK information is determined based on a maximum number of codewords received on component carriers in a specific subframe.

To further achieve these and other advantages and in accordance with the purpose of the present invention, as embodied and broadly described, a relay node in a wireless communication system having a carrier aggregation scheme applied thereto according to another embodiment of the present invention includes a wireless communication module configured to transceive a signal with a macro base station; and a processor configured to process the signal, the processor controlling the wireless communication module to receive a downlink control channel in a $1^{st}$ subframe of a primary component carrier, the processor controlling the wireless communication module to receive a data channel in the $1^{st}$ subframe and a $2^{nd}$ subframe after the $1^{st}$ subframe based on a control information included in the downlink control channel, wherein the data channel is received on at least one secondary component carrier in the $2^{nd}$ subframe and wherein the control information includes at least one of a carrier identifier for identifying a component carrier and a subframe identifier for identifying a subframe.

Preferably, the wireless communication module receives the data channel in the $1^{st}$ subframe of the primary component carrier and the $1^{st}$ subframe of the at least one secondary component carrier and also receives the data channel in the $2^{nd}$ subframe of the at least one secondary component carrier.

Preferably, the processor generates an ACK/NACK (acknowledgement/negative-ACK) information on a codeword received on the data channel, the wireless communication module transmits the ACK/NACK information to the macro base station, and a resource for transmitting the ACK/NACK information is determined based on a maximum number of codewords received on component carriers in a specific subframe.

Advantageous Effects

According to an embodiment of the present invention, if a carrier aggregation scheme is applied to a wireless communication system including a relay node, the relay node can effectively transceive signals with a macro base station.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

FIG. 6 is a diagram of a resource unit used in configuring a control channel.

BEST MODE FOR INVENTION

Figure 1:
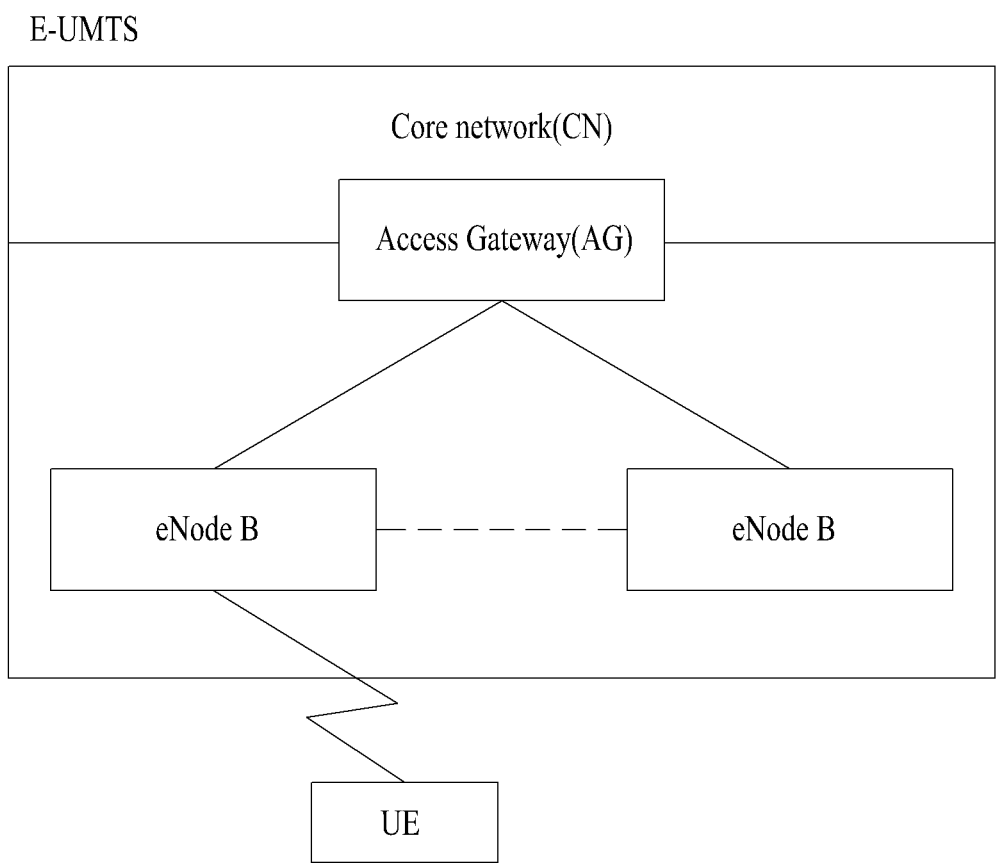
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
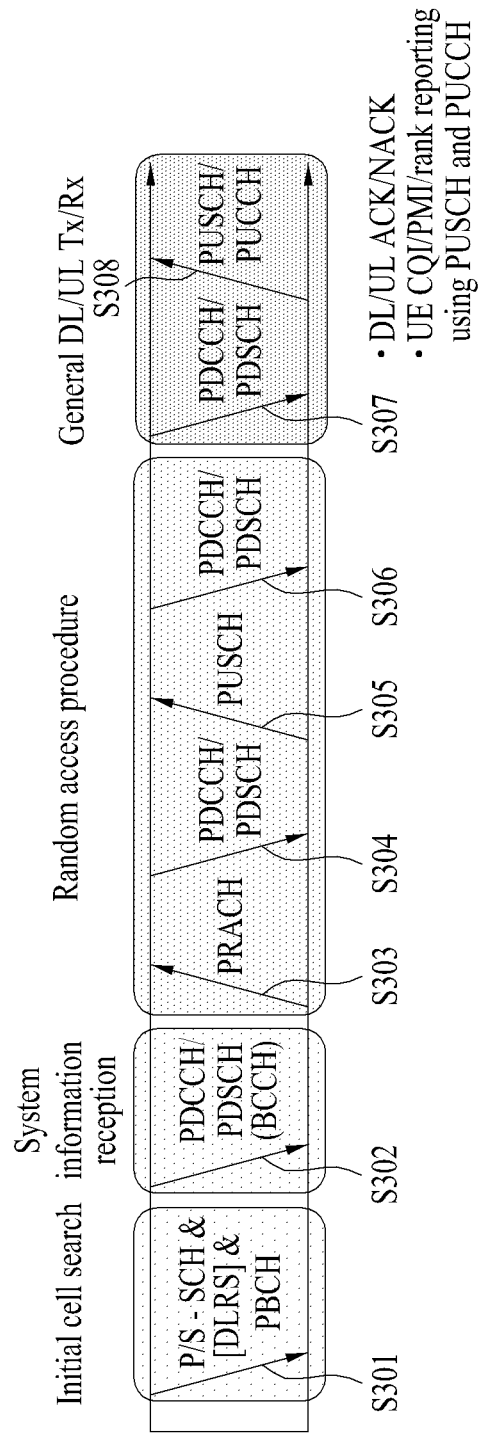
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
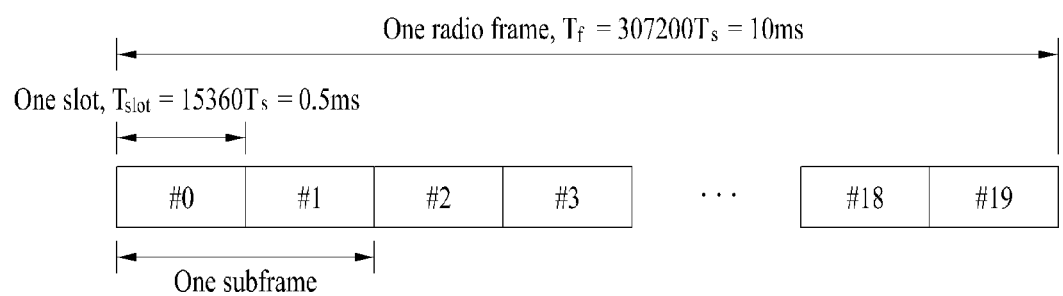
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \cdot T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s = 1/(15 \text{ kHz} \times 2048) = 3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
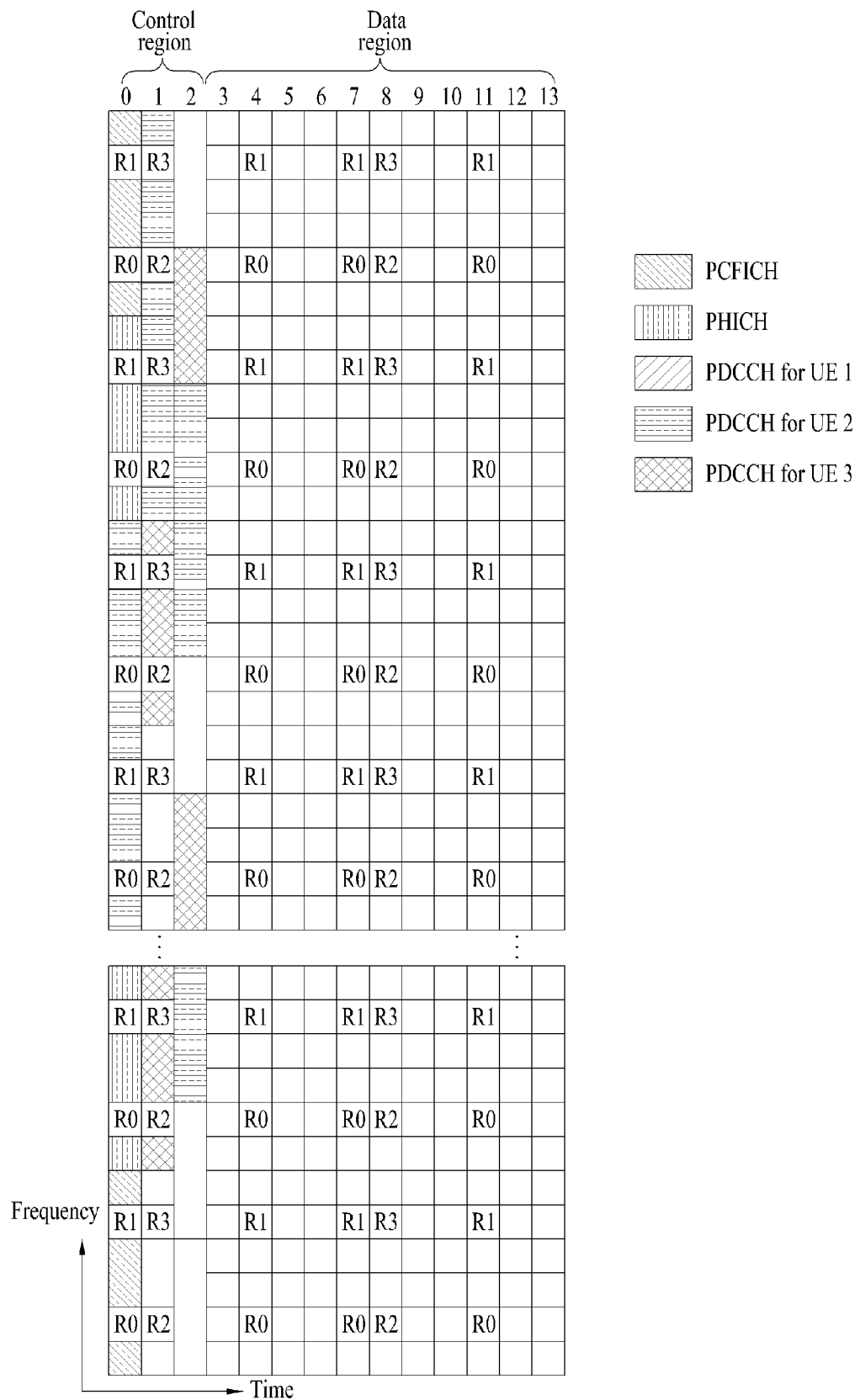
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 sub-carrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

FIG. 6 is a diagram of a resource unit used in configuring a control channel. In particular, FIG. 6(a) shows a case that the number of transmitting antennas of a base station is 1 or 2. And, FIG. 6(b) shows a case that the number of transmitting antennas of a base station is 4. The case shown in FIG. 6(a) only differs from each other in RS (reference signal) pattern but have the same method of configuring a resource unit related to a control channel.

Referring to FIG. 6, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}(\geq L)$ CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 1, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space granting an access to a specific user equipment only and a common search space granting accesses to all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap with each other.

A position of a $1^{st}$ CCE (i.e., CCE having a smallest index) in PDCCH search space given to a random user equipment for each CCE aggregation level value may vary in each subframe according to a user equipment. This may be called a PDCCH search space hashing.

Figure 7:
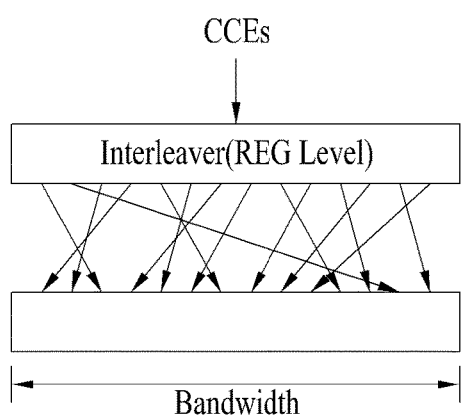
FIG. 7 is a diagram for one example of distributing CCE on a system band.

FIG. 7 is a diagram for one example of CCE distribution on a system band. Referring to FIG. 7, a plurality of CCEs logically contiguous to one another are inputted to an interleaver. In this case, the interleaver plays a role in mixing a plurality of the inputted CCEs by REG unit. Hence, frequency/time resources constructing one CCE are distributed in a manner of being physically scattered on a whole frequency/time domain within a control region of a subframe. Although a control channel is configured by CCE unit, interleaving is performed by the REG unit. Therefore, it may be able to maximize frequency diversity and interference randomization gain.

Figure 8:
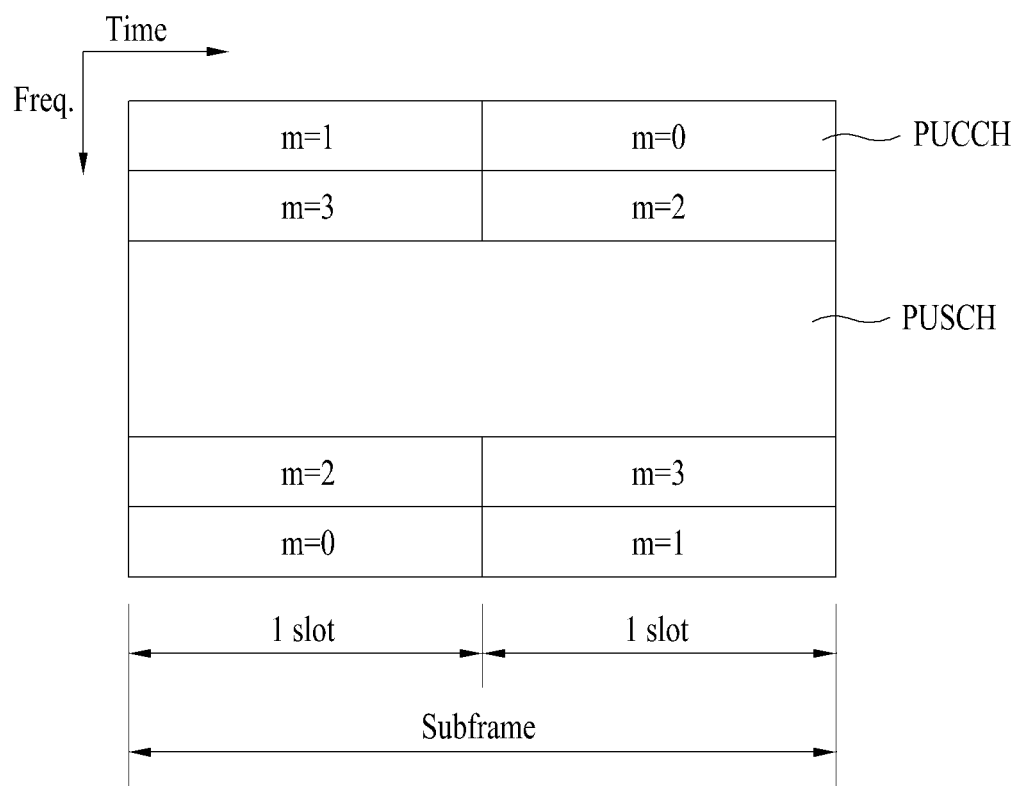
FIG. 8 is a diagram for one example of a structure of an uplink (UL) subframe used by LTE system.

FIG. 8 is a diagram for one example of a structure of an uplink (UL) subframe used by LTE system.

Referring to FIG. 8, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 7 shows one example that PUCCH (m=0), PUCCH (m=1), PUCCH (m=2), and PUCCH (m=3) are assigned to the subframe.

Meanwhile, if a channel status between a base station and a user equipment is poor, a relay node (RN) is installed between base station and the user equipment in order to provide a radio channel having a better channel status to the user equipment. In addition, a relay node is introduced to a cell edge region having a poor channel status to provide a high-speed data channel and to extend a cell service area. Thus, the relay node is being widely used to resolve the problem of the propagation shade region in a wireless communication system.

Compared to the conventional relay node having a restricted function of a repeater capable of amplifying and transmitting a signal, the latest relay node technology is being developed to cover more intelligent functions. Moreover, the relay node technology is the technology mandatory to reduce the cost requisite for establishing more base stations and the maintenance cost of a backhaul network in the next generation mobile communication system, to extend the service coverage, and to raise a data processing rate. As the relay node technology tends to be further developed, the necessity for a relay node used in the conventional wireless communication system to be supported by the new wireless communication system is rising correspondingly.

As a relay node is introduced to play a role in forwarding a link connection between a base station and a user equipment in 3GPP LTE-A (3rd generation partnership project long term evolution-advanced) system, two kinds of links differing from each other in attributes are applied to a UL carrier frequency band and a DL carrier frequency band, respectively. A connection link part established between the base station and the relay node may be represented by being defined into a backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

Figure 9:
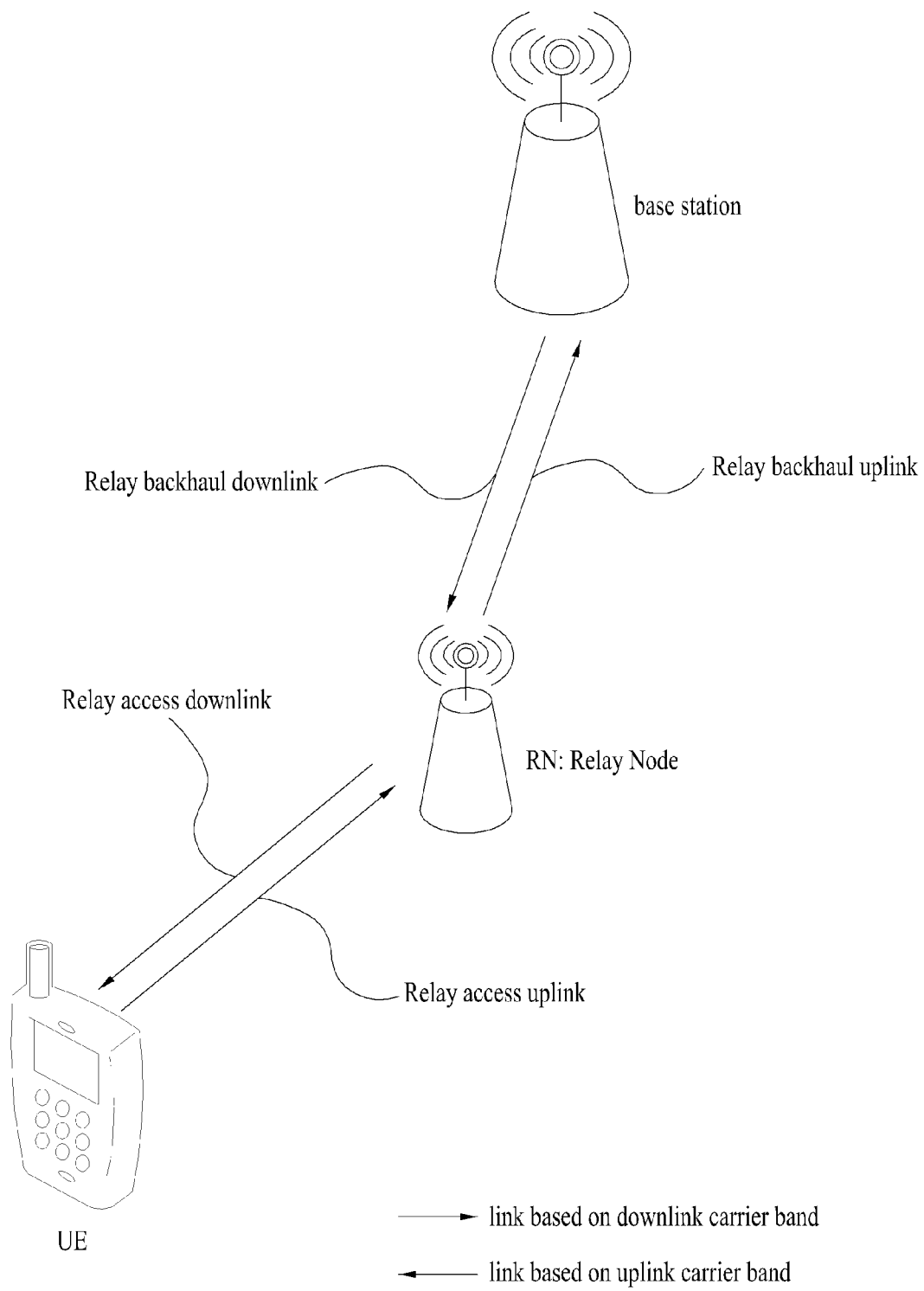
FIG. 9 is a diagram for configurations of a relay backhaul link and a relay access link in a wireless communication system.

FIG. 9 is a diagram for configurations of a relay backhaul link and a relay access link in a wireless communication system.

Referring to FIG. 9, as a relay node is introduced to play a role in forwarding a link connection between a base station and a user equipment, two kinds of links differing from each other in attributes are applied to a UL carrier frequency band and a DL carrier frequency band, respectively. A connection link part established between the base station and the relay node may be represented by being defined into a relay backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

On the other hand, a connection link part established between a relay node (RN) and a series of user equipments may be represented by being defined into a relay access link. If a transmission is performed in a manner that the relay access link uses a downlink frequency band resource (e.g., the case of FDD) or a downlink subframe resource (e.g., the case of TDD), it may be represented as an access downlink. If a transmission is performed in a manner that the relay access link uses an uplink frequency band resource (e.g., the case of FDD) or an uplink subframe resource (e.g., the case of TDD), it may be represented as an access uplink.

A relay node (RN) can receive information from a base station in a relay backhaul downlink and is able to transmit information to the base station in a relay backhaul uplink. In addition, the relay node can transmit information to the user equipment in a relay access downlink or is able to receive information from the user equipment in a relay access uplink.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment communicates with a network through a relay node. And, the 'non-transparent' may mean a case that a user equipment is able to recognize whether the user equipment communicates with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 (2nd layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay ode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on or under the ground).

As one solution for the above signal interference problem, a relay node is set not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 10:
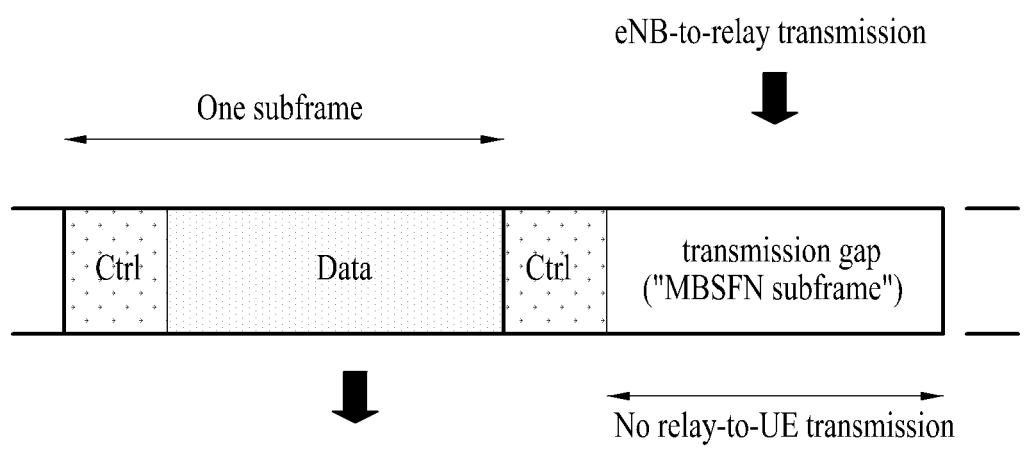
FIG. 10 is a diagram for one example of relay node resource partition.

FIG. 10 is a diagram for one example of relay node resource partitioning.

Referring to FIG. 10, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest region of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe (e.g., second subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region of the second subframe, it is able to provide backward compatibility with a legacy user equipment served by the relay node. While no signal is transmitted in the rest region of the second subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval, a relay node performs an access downlink transmission to a user equipment and may receive a backhaul downlink from a base station in the rest of the relay node non-hearing interval. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PDSCH (Relay-PDSCH), respectively.

Figure 11:
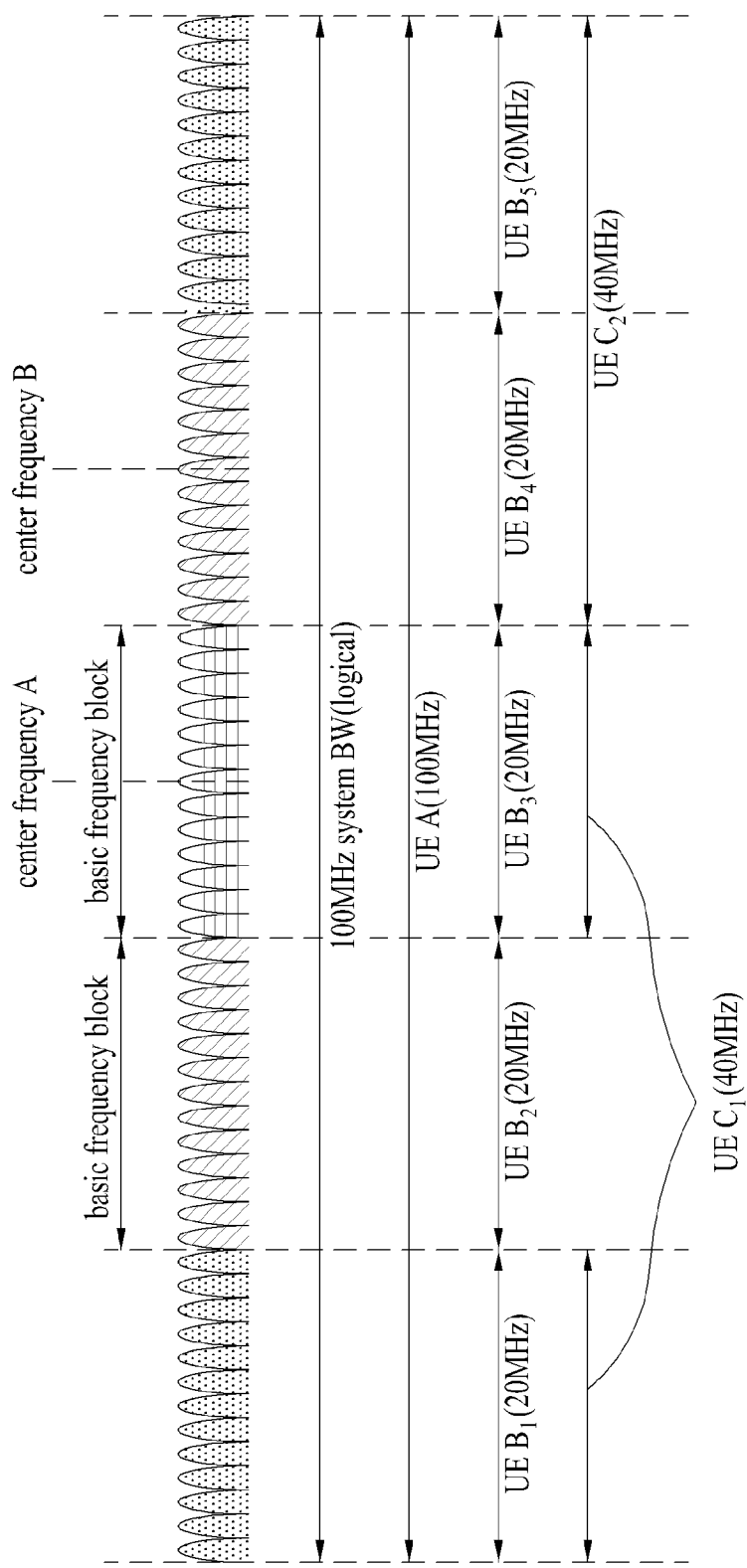
FIG. 11 is a diagram for a concept to describe a carrier aggregation scheme.

In the following description, a carrier aggregation scheme is explained. FIG. 11 is a diagram for a concept to describe a carrier aggregation scheme.

Carrier aggregation means a method for a user equipment to use one wide logical frequency band using a plurality of frequency blocks or cells (in the logical meaning) configured with uplink resources (or component carriers) and/or downlink resources (or component carriers) in order for a wireless communication system to use a wider frequency band. For clarity of the following description, such a terminology as a component carrier shall be uniformly used.

Referring to FIG. 11, a full system bandwidth (BW) is a logical band and has maximum 100 MHz of bandwidth. The full system bandwidth includes 5 component carriers. And, each of the component carriers has maximum 20 MHz of bandwidth. The component carrier includes at least one contiguous subcarrier that is physically contiguous. Although FIG. 11 shows that each of the component carriers has the same bandwidth for example, each of the component carriers can have a different bandwidth. In the drawing, the component carriers are adjacent to each other in frequency domain. Yet, the drawing is attributed to the logical concept. Hence, the component carriers may be physically adjacent to each other or may be spaced apart from each other.

A different center frequency may be used for each component carrier. Alternatively, one common center frequency may be used for component carriers physically adjacent to each other. For instance, in FIG. 11, assuming that all component carriers are physically adjacent to each other, it is able to use a center frequency A. Assuming that component carriers are not physically adjacent to each other, it is able to separately use a center frequency A, a center frequency B or the like for each component carrier.

In the present specification, a component carrier may correspond to a system bandwidth of a legacy system. If a component carrier is defined with reference to a legacy system, backward compatibility offering and system design can be facilitated in a wireless communication environment in which an advanced user equipment and a legacy user equipment coexist. For instance, in case that LTE-A system supports carrier aggregation, each component carrier may correspond to a system band of LTE system. In this case, the component carrier may have one of bandwidths including 1.25 MHz, 2.5 MHz, 5 MHz, 10 MHz, 15 MHz, and 20 MHz.

In case that a full system bandwidth is extended by carrier aggregation, a frequency band used for a communication with each user equipment (UE) is defined by component carrier unit. UE A can use a full system band 100 MHz and performs a communication using all of 5 component carriers. Each of UE $B_1$ to UE $B_5$ can use 20 MHz bandwidth only and perform a communication using one component carrier. Each of UE C1 and UE C2 can use 40 MHz bandwidth and perform a communication two component carriers. In this case, the two component carriers may be logically/physically adjacent to each other or may not. The UE $C_1$ shows a case of using two component carriers no adjacent to each other. And, the UE C2 shows a case of using two component carriers adjacent to each other.

In case of LTE system, one DL component carrier and one UL component carrier are used. On the other hand, in case of LTE-A system, several component carriers are usable as shown in FIG. 11. In doing so, schemes for a control channel to schedule a data channel can be categorized into a linked carrier scheduling scheme of the related art and a cross carrier scheduling scheme.

In particular, according to the linked carrier scheduling, like the legacy LTE system that uses a single component carrier, a control channel transmitted on a specific component carrier only schedules a data channel through the specific component carrier.

On the other hand, according to the cross scheduling, a control channel transmitted on a primary component carrier (Primary CC) schedules a data channel, which is transmitted on the primary component carrier or another component carrier, using a carrier indicator field (CID).

Figure 12:
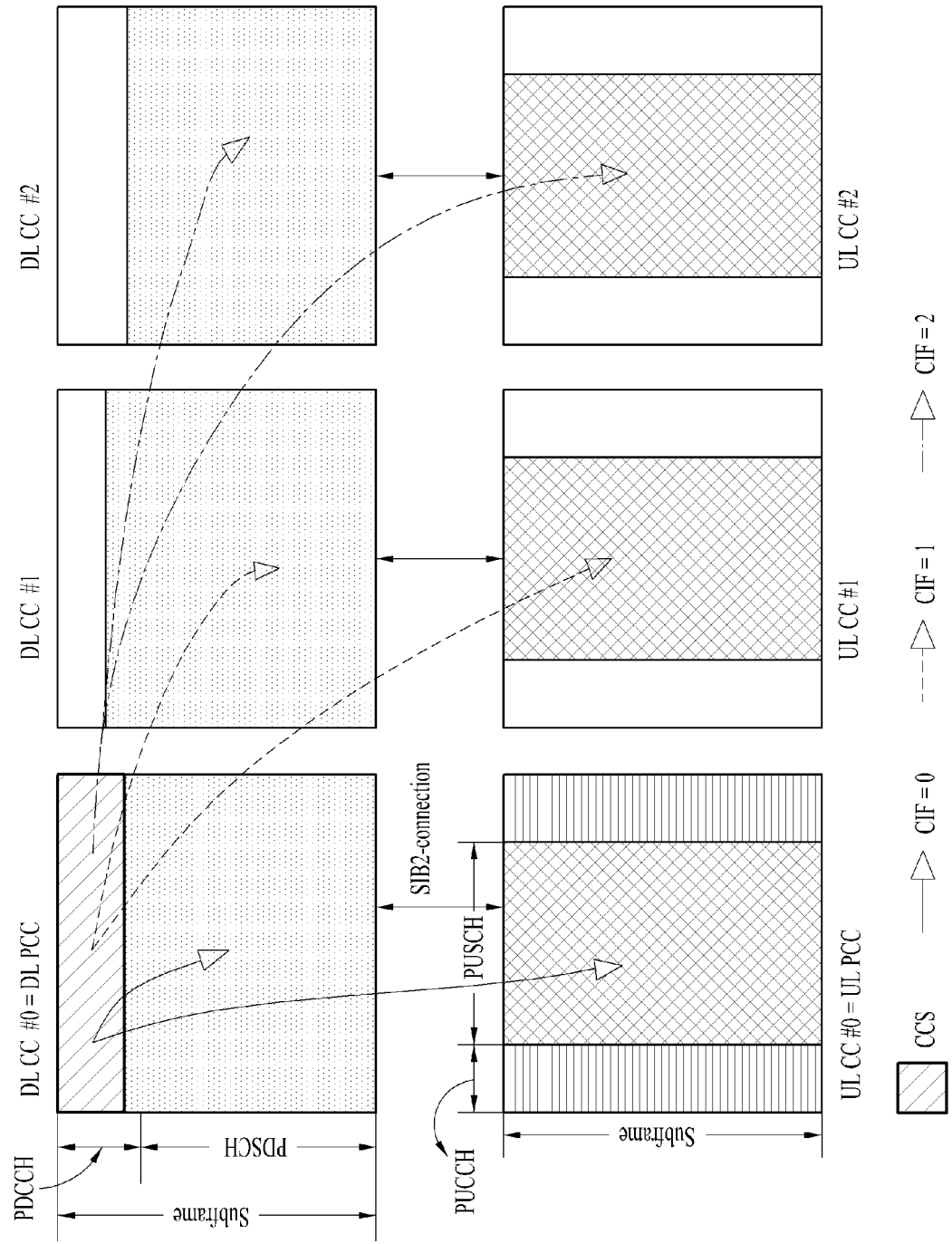
FIG. 12 is a diagram for one example of applying a cross carrier scheduling scheme.

FIG. 12 is a diagram for one example of applying a cross carrier scheduling scheme. Particularly, in FIG. 12, the number of cells (or component carriers) assigned to a relay node is 3. And, as mentioned in the foregoing description, the cross carrier scheduling scheme is performed using CIF. In this case, a DL cell (or CC) #0 and a UL cell (or CC) #0 are assumed as a primary DL component carrier (i.e., Primary Cell: PCell) and a primary UL component carrier, respectively. And, the rest of component carriers are assumed as secondary component carriers (i.e., Secondary Cells: SCells).

In the following description, a method of configuring a search space for a relay node in a carrier aggregation applied wireless communication system according to the present invention is explained.

First of all, a signaling method of a search space is described. Basically, assume that a search space for a relay node is configured by upper layer signaling. In particular, an upper layer can signal an individual search space setting per component carrier and may be able to signal one search space setting for all component carriers. For instance, if a search space setting of a primary component carrier (PCC) is signaled, a search space for a secondary component carrier can be configured to be adjacent on a logical RB index (i.e., VRB) of the search space of the primary component carrier.

If at least 3 component carriers are aggregated, it is able to consider a method of configuring logical RB indexes contiguous to each other for all component carriers irrespective of activation or deactivation of each of the component carriers. Alternatively, a fooling method is available. First of all, a logical RB index of a search space of a deactivated component carrier can be omitted. Secondly, logical RB indexes of search spaces of activated component carriers can be configured to become contiguously adjacent to each other.

In order to reduce overhead of upper layer signaling, it may be able to consider a method of indicating information on a search space of a secondary component carrier in association with upper layer signaling by equally maintaining a bit size of the upper layer signaling that indicates a search space of a primary component carrier. For instance, since a configuration of a signaled bit field follows a configuration of a resource allocation bit field of LTE system, a bit field is added in a manner of adding RB index information on a search space of a secondary component carrier to a bit field of upper layer signaling that indicates a search space of a primary component carrier. Moreover, in case that upper layer signaling is configured with a simple bitmap, it is able to simply configure a combined bit field in a manner of performing XOR operation on a bitmap for a search space of a primary component carrier and a bitmap for a search space of a secondary component carrier.

Meanwhile, an available backhaul subframe is configured through bitmap signaling in a link (i.e., backhaul link) between a macro cell and a relay node. In particular, unlike a link between a macro cell and a user equipment, the backhaul link is characterized in that subframes are not entirely available for signal transmission/reception through the backhaul link. This is because, as mentioned in the foregoing description, a communication between a macro cell and a relay node and a communication between a relay node and a user equipment are performed in a manner of sharing resources by a time division multiplexing scheme.

In the following description, in case of applying a cross carrier scheduling and configuring a different backhaul subframe for each component carrier, a corresponding scheduling method is proposed. First of all, for clarity of the following description, the following example relates to a case that two component carriers (i.e., a primary component carrier (PCC) and a secondary component carrier (SCC)) exist only.

In Table 2 in the following, whether a specific subframe is used is indicated in a manner of (PCC, SCC). 'B' means that a specific subframe is used as a backhaul link. And, 'X' means that a specific subframe is not used. For instance, (B, B) indicates a case that each of PCC and SCC uses a specific subframe as a backhaul link. (B, X) indicates a case that only PCC uses a specific subframe as a backhaul link. (X, B) indicates a case that only SCC uses a specific subframe as a backhaul link. And, (X, X) indicates a case that none of PCC and SCC PCC uses a specific subframe as a backhaul link.

TABLE 2

| | SF Index | | | | | | | | |
|---|---|---|---|---|---|---|---|---|---|
| | 0 | 1 | 2 | 3 | 4 | 5 | 6 | 7 | 8 |
| PCC | X | X | B | B | X | X | X | B | B |
| SCC | X | X | B | X | B | X | X | B | X |
| Case | Case 4 | Case 4 | Case 1 | Case 2 | Case 3 | Case 4 | Case 4 | Case 1 | Case 2 |

Since Case 4, i.e., (X, X) subframe has not special issue its details shall be omitted from the following description. In the following description, Cases 1 to 3 are explained in detail.

First Embodiment

<Case 1: (B, B)>

In case that cross carrier scheduling is applied, downlink resource allocation information (downlink assignment: DA) is transmitted in a manner of being included in control information transmitted on PCC. In doing so, a CIF (carrier identification field) exists in the control information (R-PDCCH) transmitted on the PCC and is used to indicate an SCC scheduled by the DA of the PCC.

Figure 13:
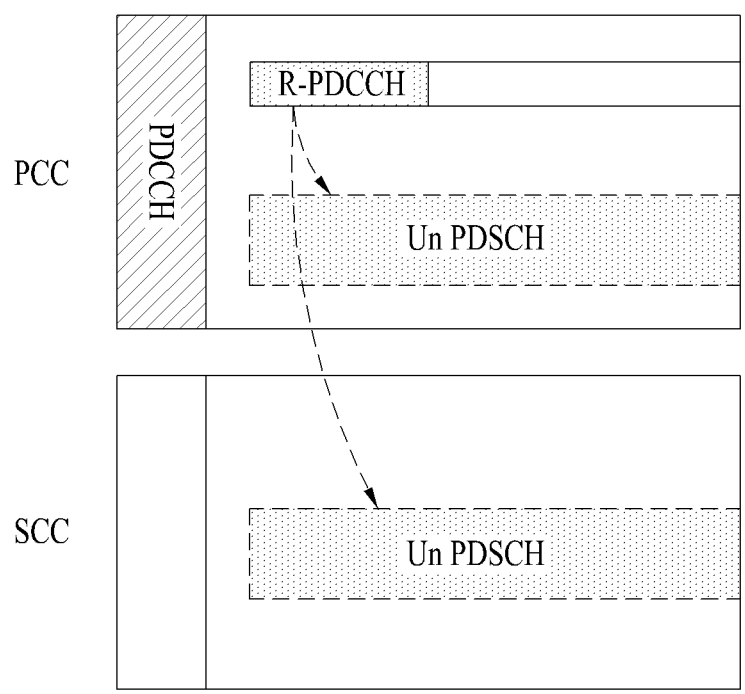
FIG. 13 is a diagram for one example of applying a scheduling according to Case 1 in an embodiment of the present invention.

FIG. 13 is a diagram for one example of applying a scheduling according to Case 1 in an embodiment of the present invention.

Referring to FIG. 13, if CIF of R-PDCCH transmitted on PCC is 000, it indicates that a backhaul link PDSCH transmitted on PCC, i.e., R-PDSCH, is scheduled. If CIF of R-PDCCH transmitted on PCC is 001, it indicates that R-PDSCH transmitted on SCC is scheduled.

In this case, if the 2 codewords (CW) are transmitted on the PCC and SCC, respectively, a channel selection scheme can be applied to a corresponding uplink ACK/NACK. For each component carrier, ACK/NACK resource is reserved through upper layer signaling per codeword and a channel selection scheme can be then performed using the reserved resource. In case that one component carrier carries one codeword only, the channel selection scheme can be performed in one of the following manners.

(1) If 4 PUCCH resources are reserved, they are mapped to codewords in order of lower (or higher) indexes. For instance, if the PUCCH resources are allocated like a $1^{st}$ codeword of PCC, a $1^{st}$ codeword of SCC and a $2^{nd}$ codeword of SCC, the last ACK/NACK resource is not used.

(2) Alternatively, PUCCH resources and the maximum number of codewords are mapped to each other and a PUCCH resource mapped to a codeword failing to be transmitted is not used. For instance, if a $2^{nd}$ codeword of PCC is not transmitted, the corresponding PUCCH resource is not used.

(3) Of course, a method of using PUCCH Format 3 newly introduced into LTE-A system is available as well. In this case, ACK/NACK informations for all codewords can be transmitted in a manner of being combined together in forward or backward order of the codewords.

<Case 1: (B, X)>

According to Case 2, although PCC is set as a backhaul subframe, SCC is not set as a backhaul subframe. Whether to assign a component carrier is set semi-statically through an RRC layer that is an upper layer. Yet, whether to set a backhaul subframe is dynamically changeable.

Figure 14:
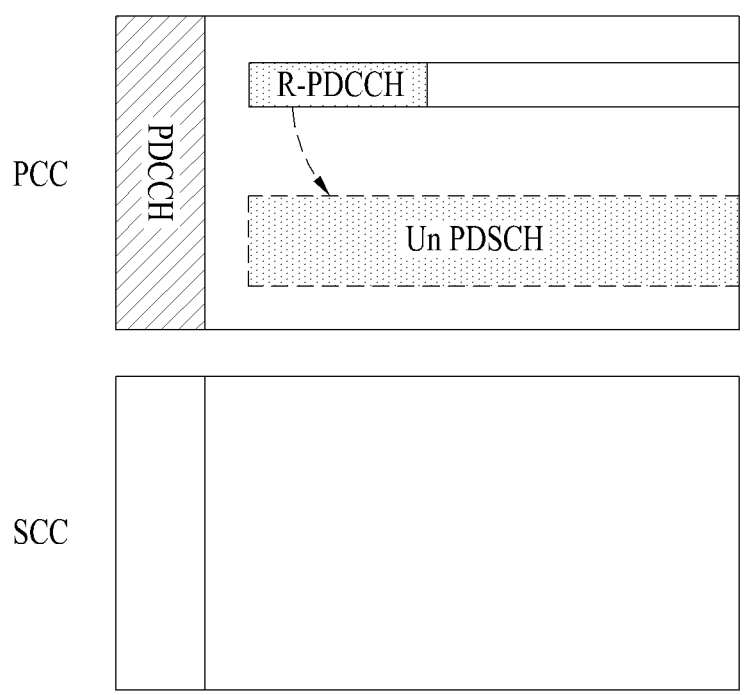
FIG. 14 is a diagram for one example of applying a scheduling according to Case 2 in an embodiment of the present invention.

FIG. 14 is a diagram for one example of applying a scheduling according to Case 2 in an embodiment of the present invention.

Referring to FIG. 14, this is the case that SCC is not set as a backhaul subframe like subframe #3 or subframe #8, downlink resource allocation information (downlink assignment: DA) of the SCC does not exist in control information transmitted on PCC. Of course, it is necessary to assume that both a macro cell and a relay node share the information, which indicates what kind of subframe is used as a backhaul link, with each other in advance.

Hence, the relay node does not attempt to perform blind decoding on the DA of the SCC. In particular, the relay node performs the blind decoding on a search space of the PCC only but does not perform the blind decoding on a search space of the SCC. In aspect of the macro cell, it is preferable that a search space of SCC is not configured at all. Thus, the relay node can reduce blind decoding complexity.

Like Case 2, if a backhaul subframe for SCC is not configured, the cross carrier scheduling is actually impossible. Hence, CIF carried on R-PDCCH of PCC is unnecessary. Hence, it is preferable that the relay node does not use CIF. In particular, a size of downlink control information is changed.

For instance, it is able to lower a decoding error probability in a manner of ignoring a value of the CIF in spite of a reception of the CIF or fixing the CIF to a predetermined value (e.g., fixing it to a state in which the cross carrier scheduling does not exist). If the meaning of 'not using the CIF' is construed in a different way, it may mean that a presence or non-presence of existence of a CIF field can be changed by subframe unit. In particular, although it may be represented as the cross carrier scheduling is turned on/off [ON/OFF], it may be also represented as a presence or non-presence of existence of a CIF field is changed in a situation that CSS is always applied.

Alternatively, it is able to consider a following method. First of all, both search spaces of PCC and SCC are used. Secondly, an actual transmission of downlink resource allocation information can be designed to be situated at any places of the two search spaces. In particular, resource allocation information corresponding to the PCC can be transmitted on any locations of the search spaces of the PCC and SCC. Moreover, it is possible to apply a search space stealing concept of using a search space of another component carrier instead of using a search space of its own. This method can increase scheduling flexibility of a macro cell.

In case that component carriers differ from each other in bandwidth, search spaces of PCC and SCC can be configured to overlap each other. Since a Transmission Mode™ used by a relay node is very limitative, it is highly probable that DCI format sizes of component carriers are identical to each other. Hence, if the overlapped search spaces are used, it will help to secure flexibility of the search space settings.

Since PCC carries codeword(s), if the PCC is set to carry one codeword only for the uplink ACK/NACK transmission, the ACK/NACK transmission is preferably performed using PUCCH Format 1a. If the PCC is set to carry maximum two codewords for the uplink ACK/NACK transmission, the ACK/NACK transmission is preferably performed using PUCCH Format 1b.

Hence, if a previous subframe (e.g., subframe #2) corresponds to Case 1, when maximum two codewords are carried on each of two component carriers, a channel selection scheme is used to transmit ACK/NACK for maximum 4 codewords. Yet, if a current subframe (e.g., subframe #3) corresponds to Case 2, one component carrier is set only and maximum two codewords are transmittable. In this situation, it is enough to transmit ACK/NACK for maximum 2 codewords only. Hence, the corresponding transmission can be performed not using the channel selection scheme but using PUCCH Format 1a or PUCCH Format 1b.

This means a change of a PUCCH transmission mode in a cross carrier scheduling applied situation. A resource for transmitting ACK/NACK signal using PUCCH Format 1a or PUCCH Format 1b may include an ACK/NACK resource associated with a CE index or a resource reserved by upper layer signaling. Particularly, in order to apply the channel selection scheme, a plurality of PUCCH resources are allocated. If an operation is performed using one PUCCH Format 1a or PUCCH Format 1b only in a subframe unavailable for the cross carrier scheduling, a specific resource (e.g., $1^{st}$ PUCCH resource) can be regulated to be used among the allocated PUCCH resources.

<Case 3: (X, B)>

Case 3 relates to a case that PCC has no search space for cross carrier scheduling and that the PCC is unable to carry downlink resource allocation information 'DA'. Hence, it is preferable that the cross carrier scheduling is performed in a valid backhaul subframe assigned to PCC prior to a corresponding subframe. This is called a predictive scheduling or a multi-subframe scheduling.

Figure 15:
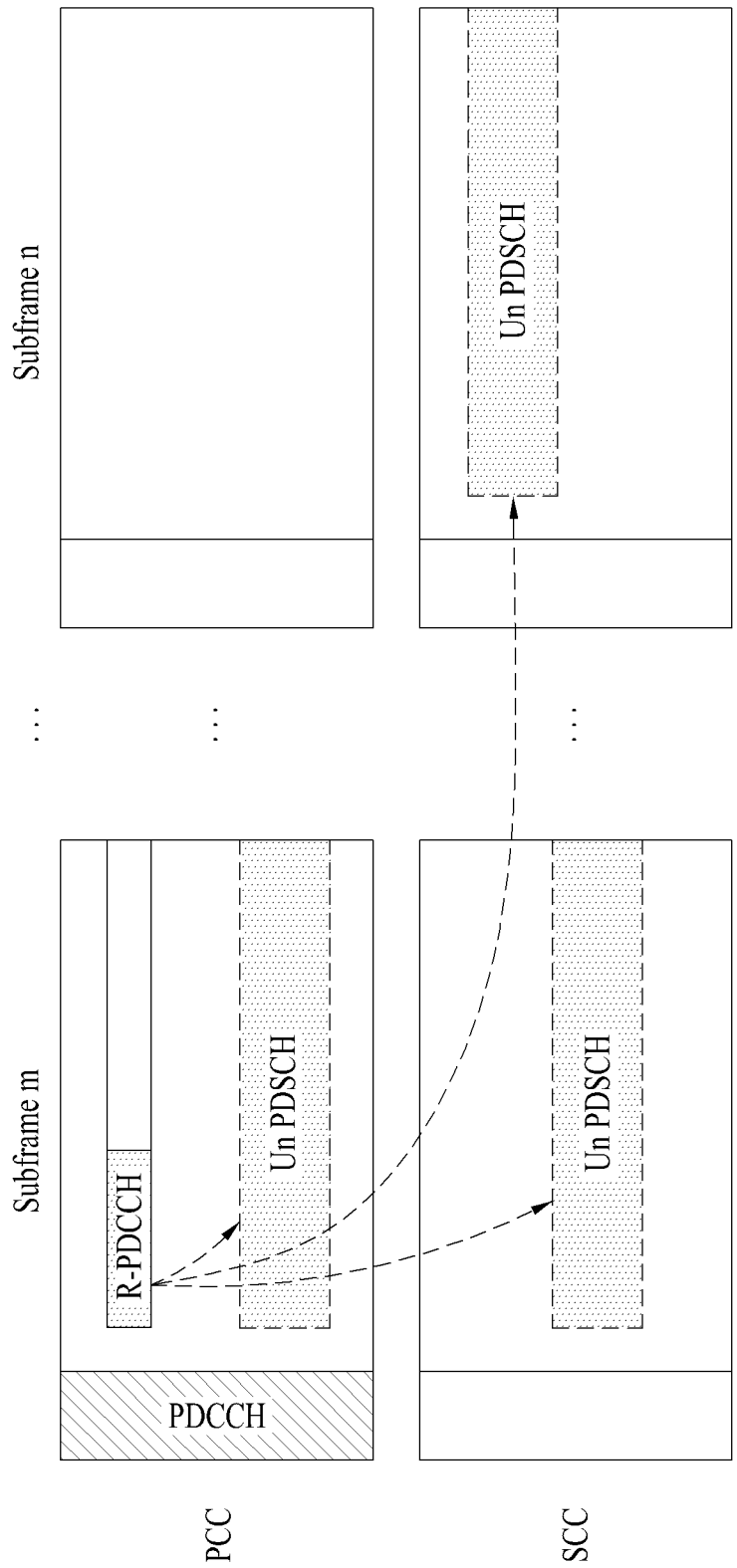
FIG. 15 is a diagram for one example of applying a scheduling according to Case 3 in an embodiment of the present invention.

FIG. 15 is a diagram for one example of applying a scheduling according to Case 3 in an embodiment of the present invention.

Referring to FIG. 15, for instance, a scheduling grant for SCC is transmitted in a closest subframe 'm' available for a cross carrier scheduling among PCC subframes existing prior to a subframe 'n' of PCC.

In doing so, since the previous subframe 'm' should perform a scheduling in the current subframe 'n', i.e., a multi-subframe scheduling simultaneously, as well as support s cross carrier scheduling in the corresponding subframe, a signaling for playing a role as a separate subframe indicator (indication) is required as well as a CIF.

On the other hand, if the predictive scheduling or the multi-subframe scheduling is not performed, although the cross carrier scheduling is applied, when PCC does not exist due to an occurrence of such a situation (X, B) as Case 3, it is unable to use SCC independently. Hence, it is highly probable that resources are wasted. In this case, it is preferable that the SCC independently operates like a non-cross carrier scheduling mode.

Figure 16:
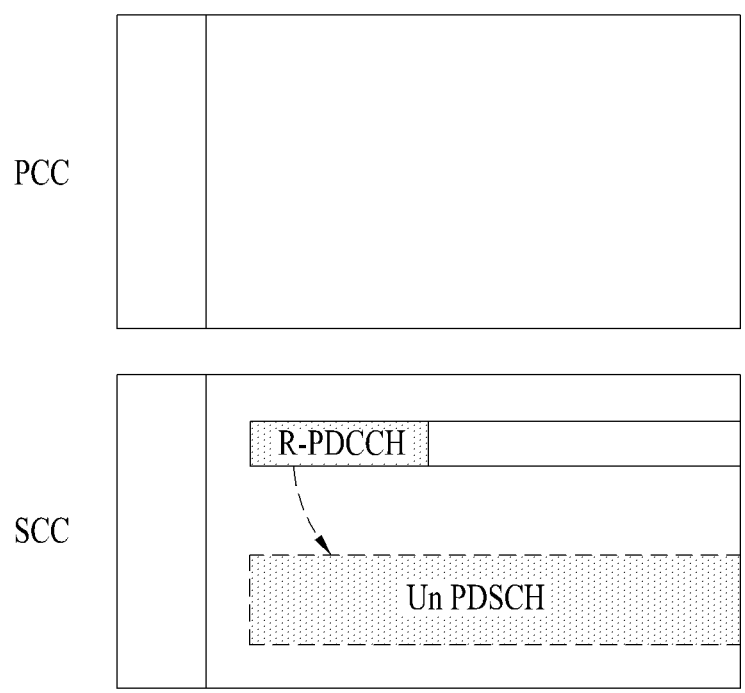
FIG. 16 is a diagram for another example of applying a scheduling according to Case 3 in an embodiment of the present invention.

FIG. 16 is a diagram for another example of applying a scheduling according to Case 3 in an embodiment of the present invention.

Referring to FIG. 16, a search space of SCC is configured in a resource region of the SCC. If a downlink resource allocation information of the SCC is transmitted on the configured resource region, a relay node performs blind decoding on the transmitted downlink allocation information. In doing so, assume that a CIF field does not exist in the downlink resource allocation information of the SCC.

In this case, a cross carrier scheduling itself is deactivated. Yet, in some cases, it may happen that a change by subframe unit is impossible. Even if the cross carrier scheduling is activated, the cross carrier scheduling may not be actually applied to a corresponding subframe. Hence, a CIF itself has no meaning. Even if the CIF exists, it is preferable that the CIF is not used. In particular, the corresponding scheduling operates in form of a signal carrier scheduling.

To enable such an operation, it means that a link quality of SCC is as good as that of PCC. In particular, the reason for performing a cross carrier scheduling is to transmit a control channel on PCC when a link quality of PCC is good but that of SCC is not. Yet, if a control channel is transmittable on SCC, it may mean that a link quality of the SCC is secured.

Meanwhile, since only SCC carries codeword in Case 3, i.e., a subframe (X, B), it is preferable that PUCCH Format 1a or PUCCH Format 1b is used for ACK/NACK transmission. For instance, if the SCC is set for a transmission of maximum 1 codeword, uplink ACK/NACK transmission can be performed using PUCCH Format 1a. For another instance, if the SCC is set for a transmission of maximum 2 codewords, uplink ACK/NACK transmission can be performed using PUCCH Format 1b.

Like Case 2 mentioned in the foregoing description, a transmission of PUCCH Format 1a/1/b on a single carrier is meant in PUCCH transmission on two carriers using a channel selection scheme, which means a change of a PUCCH transmission mode. A resource for transmitting ACK/NACK signal may include an ACK/NACK resource associated with CCE index or a resource reserved by upper layer signaling. Moreover, PUCCH transmission is preferably performed in an uplink subframe associated with an SCC downlink subframe.

Yet, in TDD system, an SCC uplink subframe associated with a PCC downlink subframe at the timing point of an occurrence of an uplink transmission is not an available subframe, an uplink subframe of PCC is available for the corresponding transmission.

Second Embodiment

Although the above description defines an operation in case of using each Case independently, a search space and an uplink ACK/NACK transmission can be modified depending on a feature that each Case is located on time.

<Case 1+Case 3>

First of all, a combined case of Case 1 and Case 3 is described with reference to Table 3 in the following. In Table 3, it is unnecessary for a subframe m and a subframe n to be adjacent to each other.

TABLE 3

| SF Index | m | n |
|---|---|---|
| PCC | B | X |
| SCC | B | B |
| Case | Case 1 | Case 3 |

Figure 17:
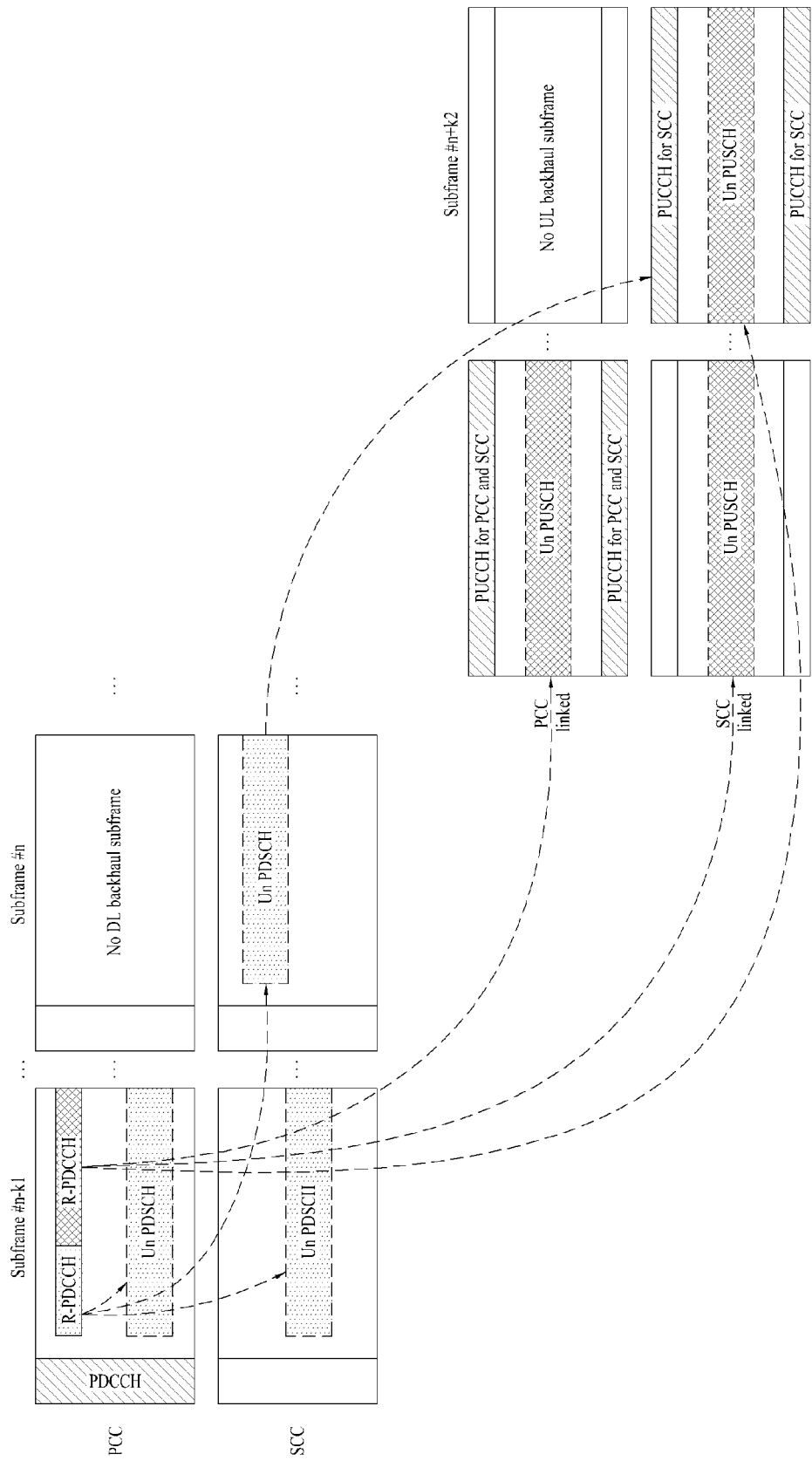
FIG. 17 is a diagram for one example of a scheduling method in case of a combination of Case 1 and Case 3 according to an embodiment of the present invention.

FIG. 17 is a diagram for one example of a scheduling method in case of a combination of Case 1 and Case 3 according to an embodiment of the present invention.

Referring to FIG. 17, both a subframe #(n−k1) of SCC and a subframe #n of the SCC should be scheduled in a subframe #(n−k1) of PCC. In particular, a cross subframe scheduling should be performed as well as a cross carrier scheduling. Hence, in order to perform the cross carrier scheduling in the subframe #(n−k1) of the SCC, CIF is necessary for a downlink resource allocation information of the PCC. And, a CIF is necessary for resource allocation information of SCC as well. Moreover, in order to discriminate the subframe #(n−k1) of the SCC and the subframe #n of the SCC from each other, a subframe indicator is necessary in addition.

The above-mentioned operating method is identically applicable, as shown in FIG. 17, to an uplink grant using CIF, SIF and the like.

<Case 2+Case 3>

Secondly, a combined case of Case 2 and Case 3 is described with reference to Table 4 in the following. In Table 4, it is unnecessary for a subframe m and a subframe n to be adjacent to each other.

TABLE 4

| SF Index | m | n |
|---|---|---|
| PCC | B | X |
| SCC | X | B |
| Case | Case 2 | Case 3 |

Figure 18:
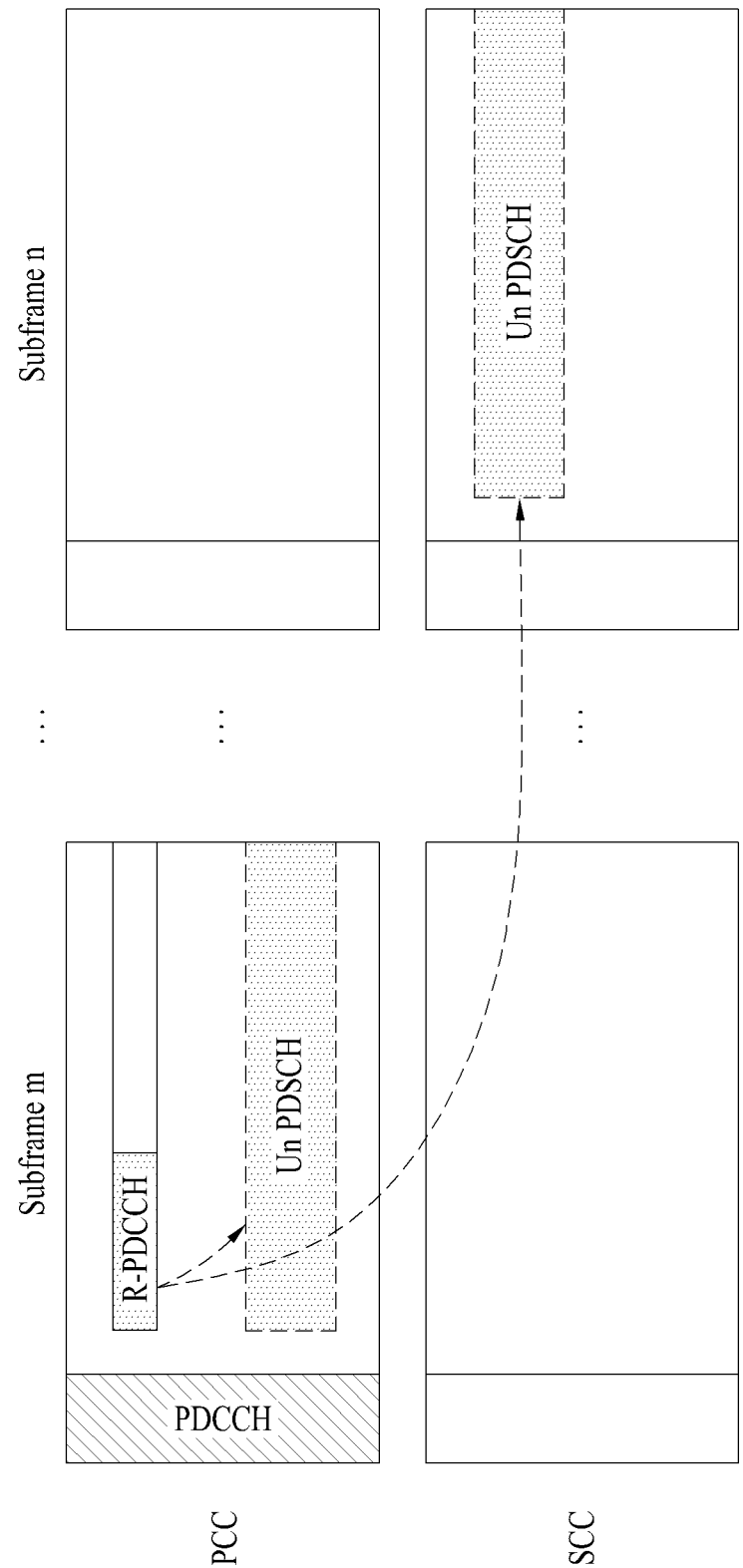
FIG. 18 is a diagram for one example of a scheduling method in case of a combination of Case 2 and Case 3 according to an embodiment of the present invention.

FIG. 18 is a diagram for one example of a scheduling method in case of a combination of Case 2 and Case 3 according to an embodiment of the present invention.

Referring to FIG. 18, in order to perform a scheduling (e.g., Case 3) of a subframe #n of SCC, a resource allocation information of the subframe #n should be transmitted in a subframe #m of PCC. Hence, the subframe #m of the PCC should transmit a downlink resource allocation information on the subframe #n of the SCC together with a downlink resource allocation information of the PCC at the same time. In doing so, identifiers for identifying the subframes are required. Yet, in this case, since CIF is unnecessary, it is able to consider a method of using an unused CIF as a subframe identifier.

The above-mentioned operating method is identically applicable, as shown in FIG. 18, to an uplink grant using CIF, SIF and the like.

<Case 2+One of Cases 1, 2 and 4>

Thirdly, a combined case of Case 2 and one of Cases 1, 2 and 4 is described with reference to Table 5 in the following. In Table 5, it is unnecessary for a subframe m and a subframe n to be adjacent to each other.

TABLE 5

| SF Index | m | n |
|---|---|---|
| PCC | B | B, B, X |
| SCC | X | B, X, X |
| Case | Case 2 | Case 1, Case 2, Case 4 |

In case of Table 5, it is unnecessary to perform a cross carrier scheduling on a next-coming PCC or SCC of Case 1 in a subframe #m of PCC. Hence, in the subframe #n, a search space of the PCC is configured only and a downlink resource allocation information on the PCC is transmitted.

On the other hand, when 3 component carriers including PCC, SCC1 and SCC2 are aggregated, Table 6 shows a case that it is (B, B, B) in a subframe #m and that a subframe for one component carrier is not a backhaul subframe in a subframe #n. In particular, in case that the subframe #n corresponds to one of (B, B, X), (B, X, B) and (X, B, B), a PUCCH transmission for an uplink ACK/NACK transmission can be changed as follows.

TABLE 6

| SF Index | m | | n | |
|---|---|---|---|---|
| PCC  | B | B | B | X |
| SCC1 | B | B | X | B |
| SCC2 | B | X | B | B |
| Case | Case BBB | | Case BBX, BXB, XBB | |

In this case, it is able to perform a PUCCH transmission on 3 resources in the subframe #n using a resource for an unused component carrier. Yet, in order to obtain better performance, it is preferable that a channel selection scheme is applied using 2 resources suitable for 2 component carriers. Meanwhile, in case that Case BBB is changed into Case BBX, it is preferable that ACK/NACK bits are reduced by a size corresponding to the reduced component carriers in PUCCH Format 3 as well.

Table 7 shows a case that a subframe #n is changed into Case BXX from Case BBB. Likewise, this case requires a change of a PUCCH transmitting scheme. And, the operation described for Case (B, X) can be applied to the present case.

TABLE 7

| SF Index | m | n |
|---|---|---|
| PCC  | B | B |
| SCC1 | B | X |
| SCC2 | B | X |
| Case | Case BBB | Case BXX |

Figure 19:
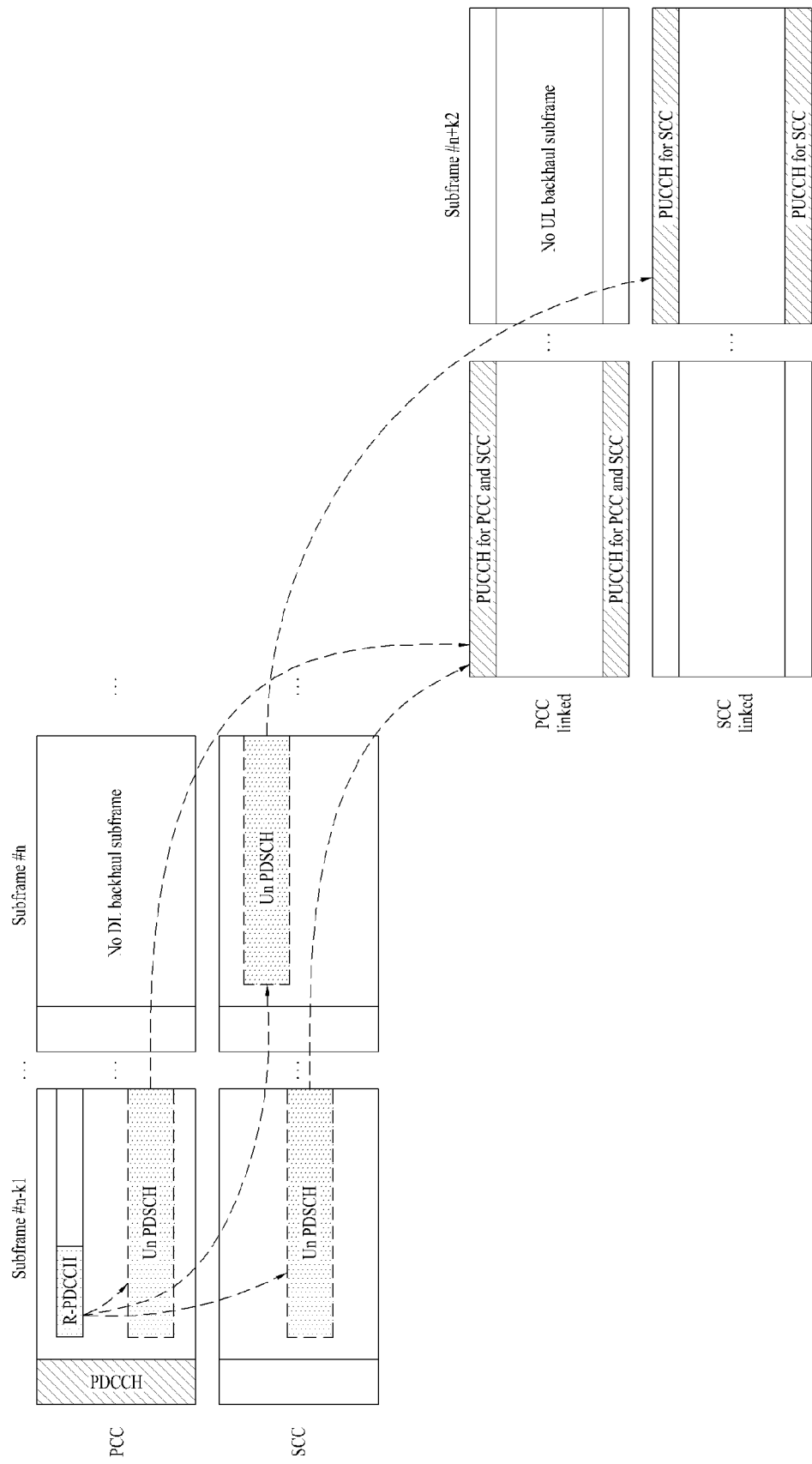
FIG. 19 and FIG. 20 are diagrams for examples of cross carrier scheduling in case that Case BB is changed into Case XB.
Figure 20:
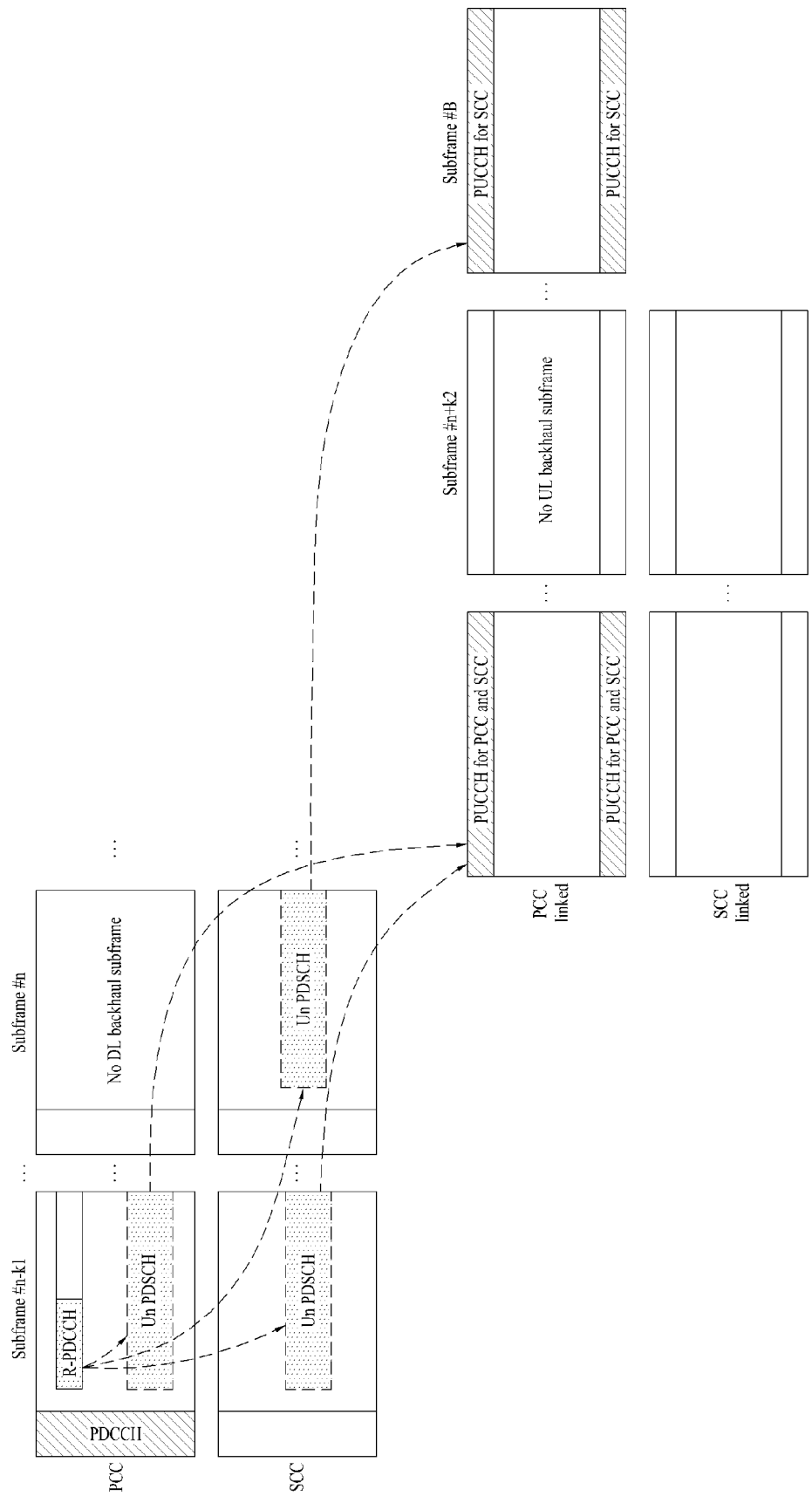

FIG. 19 and FIG. 20 are diagrams for examples of cross carrier scheduling in case that Case BB is changed into Case XB.

FIG. 19 assumes a situation that a cross carrier scheduling is performed on PDSCH of SCC in a subframe #n as well as PDSCH of a corresponding subframe in a subframe #(n−k1). In this case, ACK/NACK for the PDSCH of the SCC in the subframe #n is characterized in being transmitted on PUCCH of SCC in a subframe #(n+k2). For instance, it may be 'k1=1' or 'k2=4'.

Alternatively, referring to FIG. 20, it is able to transmit a corresponding ACK/NACK in an initial backhaul subframe (e.g., subframe #B in FIG. 20) appearing after a subframe #(n+k2).

Figure 21:
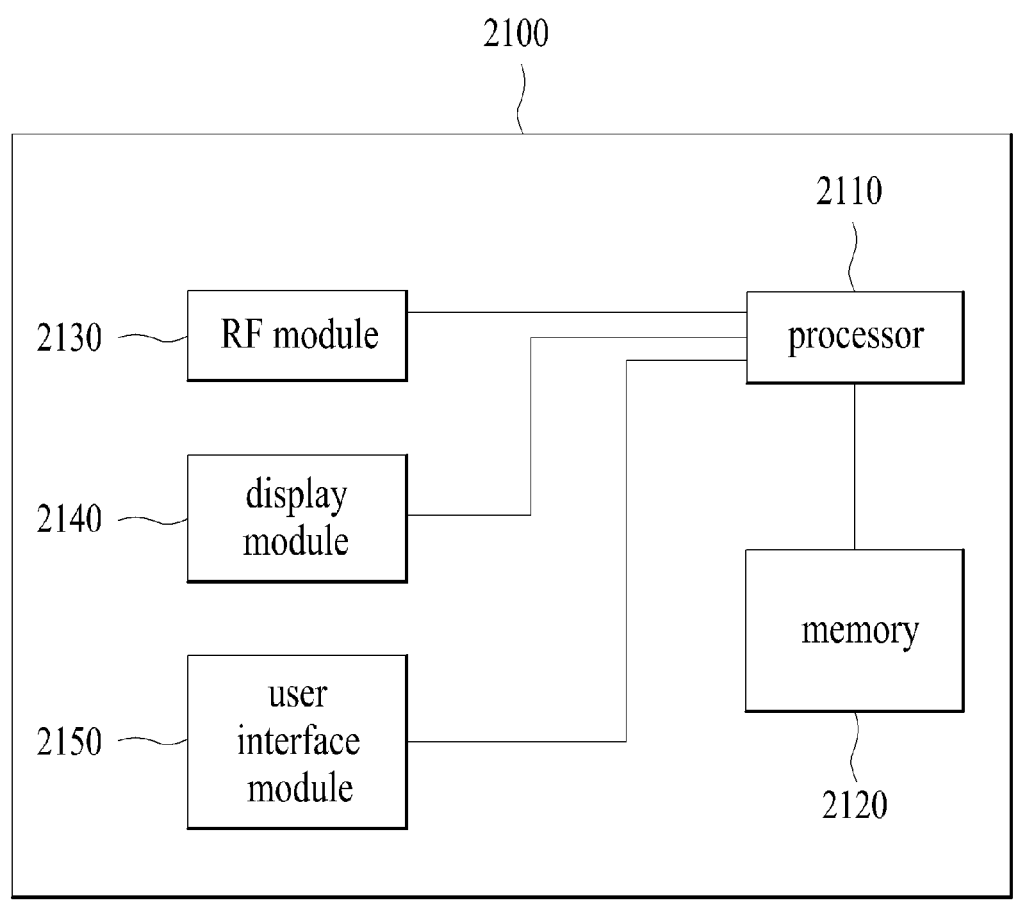
FIG. 21 is a block diagram for one example of a communication device according to one embodiment of the present invention.

FIG. 21 is a block diagram for one example of a communication device according to one embodiment of the present invention.

Referring to FIG. 21, a communication device 2100 includes a processor 2110, a memory 2120, an RF module 2130, a display module 2140 and a user interface module 2150.

The communication device 2100 is illustrated for clarity and convenience of the description and some modules can be omitted. Moreover, the communication device 2100 may further include at least one necessary module. And, some modules of the communication device 2100 can be further divided into sub-modules. The processor 2110 is configured to perform operations according to the embodiment of the present invention exemplarily described with reference to the accompanying drawings. In particular, the detailed operations of the processor 2110 can refer to the contents described with reference to FIGS. 1 to 20.

The memory 2120 is connected to the processor 2110 and stores an operating system, applications, program codes, data and the like. The RF module 2130 is connected to the processor 2110 and performs a function of converting a baseband signal to a radio signal or converting a radio signal to a baseband signal. For this, the RF module 2130 performs analog conversion, amplification, filtering and frequency uplink transform or inverse processes thereof. The display module 2140 is connected to the processor 2110 and displays various kinds of informations. The display module 2140 can include such a well-known element as LCD (Liquid Crystal Display), LED (Light Emitting Diode), OLED (Organic Light Emitting Diode) and the like, by which the present invention is non-limited. The user interface module 2150 is connected to the processor 2110 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for a relay node to transceive a signal in a wireless communication system having a carrier aggregation scheme applied thereto and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of receiving a signal from a macro base station at a relay node in a wireless communication system applying a carrier aggregation scheme, the method comprising: receiving from the macro base station, by the relay node, a backhaul subframe configuration for a primary component carrier (PCC) and a secondary component carrier (SCC), the backhaul subframe configuration indicating one or more downlink backhaul subframes, which are used for a communication from the macro base station to the relay node receiving from the macro base station, by the relay node, scheduling information indicating transmission of a data channel through the SCC in a subframe #n; and receiving from the macro base station, by the relay node, a data channel through the SCC in the subframe #n based on the scheduling information;

wherein the scheduling information is received through the PCC in the subframe #n when the subframe #n of the PCC is configured as a backhaul subframe based on the backhaul subframe configuration, wherein the scheduling information is received through the PCC in a subframe #n−k, when the subframe #n of the PCC is configured as a non-backhaul subframe and the subframe #n−k of the PCC is configured as the backhaul subframe based on the backhaul subframe configuration, and wherein n is an integer, and k is a natural number.

2. The method of claim 1, wherein the scheduling information is received by blind decoding on a search space configured in a data region of the PCC in the subframe #n−k, when the subframe #n of the PCC is configured as the non-backhaul subframe and the subframe #n−k of the PCC is configured as the backhaul subframe based on the backhaul subframe configuration.

3. The method of claim 1, further comprising:
transmitting ACK/NACK (acknowledgement/negative-ACK) information for one or more codewords received on the data channel to the macro base station.

4. A relay node in a wireless communication system applying a carrier aggregation scheme, the relay node comprising:
a wireless receiver that receives a signal from a macro base station; and a processor that process the signal, and controls the wireless receiver to receive a backhaul subframe configuration for a primary component carrier (PCC) and a secondary component carrier (SCC), the backhaul subframe configuration indicating one or more downlink backhaul subframes, which are used for a communication from the macro base station to the relay node, to receive scheduling information indicating transmission of a data channel through the SCC in a subframe #n, and to receive the data channel through the SCC in the subframe #n based on the scheduling information, wherein the scheduling information is received through the PCC in the subframe #n when the subframe #n of the PCC is configured as a backhaul subframe based on the backhaul subframe configuration, wherein the scheduling information is received through the PCC in a subframe #n−k, when the subframe #n of the PCC is configured as a non-backhaul subframe and the subframe #n−k of the PCC is configured as the backhaul subframe based on the backhaul subframe configuration, and wherein n is an integer, and k is a natural number.

5. The relay node of claim 4, wherein the scheduling information is received by blind decoding on a search space configured in a data region of the PCC in the subframe #n−k, when the subframe #n of the PCC is configured as the non-backhaul subframe and the subframe #n−k of the PCC is configured as the backhaul subframe based on the backhaul subframe configuration.

6. The relay node of claim 4, wherein the processor generates ACK/NACK (acknowledgement/negative-ACK) information for one or more codewords received on the data channel.

7. The method of claim 1, wherein the scheduling information comprises a carrier identifier indicating the SCC.

8. The method of claim 1, wherein the scheduling information comprises a subframe identifier indicating the subframe #n, when the subframe #n of the PCC is configured as the non-backhaul subframe and the subframe #n−k of the PCC is configured as the backhaul subframe based on the backhaul subframe configuration.

9. The method of claim 1, further comprising:
transmitting ACK/NACK (acknowledgement/negative-ACK) information for the data channel to the macro base station through the PCC in a subframe #n+m, when the subframe #n+m of the PCC is configured as the backhaul subframe based on the backhaul subframe configuration, and wherein m is a natural number.

10. The method of claim 1, further comprising:
transmitting ACK/NACK (acknowledgement/negative-ACK) information for the data channel to the macro base station through the SCC in a subframe #n+m, when the subframe #n+m of the PCC is configured as the normal subframe and the subframe #n+m of the SCC is configured as the backhaul subframe based on the backhaul subframe configuration, and wherein m is a natural number.

11. The method of claim 1, further comprising:
transmitting ACK/NACK (acknowledgement/negative-ACK) information for the data channel to the macro base station through the PCC in a backhaul subframe #n+m, when the subframe #n+m of the PCC is configured as a non-backhaul normal subframe based on the backhaul subframe configuration, and wherein m is a natural number.

12. The relay node of claim 4, wherein the scheduling information comprises a carrier identifier indicating the SCC.

13. The relay node of claim 4, wherein the scheduling information comprises a subframe identifier indicating the subframe #n, when the subframe #n of the PCC is configured as the non-backhaul subframe and the subframe #n−k of the PCC is configured as the backhaul subframe based on the backhaul subframe configuration.

14. The relay node of claim 4, further comprising a wireless transmitter, wherein the processor controls the wireless transmitter to transmit ACK/NACK (acknowledgement/negative-ACK) information for the data channel to the macro base station through the PCC in a subframe #n+m, when the subframe #n+m of the PCC is configured as the backhaul subframe based on the backhaul subframe configuration, and wherein m is a natural number.

15. The relay node of claim 4, further comprising a wireless transmitter, wherein the processor controls the wireless transmitter to transmit ACK/NACK (acknowledgement/negative-ACK) information for the data channel to the macro base station through the SCC in a subframe #n+m, when the subframe #n+m of the PCC is configured as a normal subframe and the subframe #n+m of the SCC is configured as the backhaul subframe based on the backhaul subframe configuration, and wherein m is a natural number.

16. The relay node of claim 4, further comprising a wireless transmitter, wherein the processor controls the wireless transmitter to transmit ACK/NACK (acknowledgement/negative-ACK) information for the data channel to the macro base station through the PCC in a backhaul subframe after the PCC in a subframe #n+m, when the subframe #n+m of the PCC is configured as a non-backhaul normal subframe based on the backhaul subframe configuration, and wherein m is a natural number.

* * * * *